United States Patent [19]

Haag et al.

[11] Patent Number: 5,316,039
[45] Date of Patent: May 31, 1994

[54] CARTRIDGE-TYPE FAUCET VALVE WITH IMPROVED SEAL

[75] Inventors: William D. Haag, Hoffman Estates; A. Richard Emmerson, Buffalo Grove; Daniel J. Laube, Oak Park, all of Ill.

[73] Assignee: The Chicago Faucet Company, Des Plaines, Ill.

[21] Appl. No.: 1,257

[22] Filed: Jan. 6, 1993

[51] Int. Cl.$^5$ ............................................. F16K 27/02
[52] U.S. Cl. .................................. 137/454.6; 251/221
[58] Field of Search ...................... 137/454.6; 251/221, 251/222

[56] References Cited
U.S. PATENT DOCUMENTS

| 951,407 | 3/1910 | Moore | 137/454.6 |
| 2,159,452 | 5/1939 | Samaras | 137/454.6 |
| 3,511,470 | 5/1970 | Beckett et al. | 137/454.6 X |
| 3,523,551 | 8/1970 | Schmitt | 137/454.6 |
| 3,777,777 | 12/1973 | Katchka | 137/454.6 |
| 4,156,519 | 5/1979 | Janz et al. | 137/454.6 X |
| 4,922,950 | 5/1990 | Taylor | 137/454.6 X |

Primary Examiner—Stephen M. Hepperle
Attorney, Agent, or Firm—Leydig, Voit & Mayer

[57] ABSTRACT

A cartridge-type faucet valve is provided which includes a housing with an inlet, an outlet and an insert assembly (or cartridge) seat interposed between the inlet and outlet and for cooperating with a portion of an insert assembly or cartridge to provide a seal between the inlet and outlet. The insert assembly or cartridge includes a stationary elongated sleeve and a stem mounted within the sleeve which is longitudinally movable over a range of travel between a closed position and a fully open position. One section of the stem co-acts with the sleeve to control the longitudinal position of the stem. Another section of the stem cooperates with an internal surface portion of the sleeve to provide a longitudinally extending flow passage for communicating from the inlet to the outlet. A seal piece is mounted on the stem and is adapted for engagement with a stationary seating surface adjacent one end of the sleeve. In operation, the seal piece is engaged with the seating surface only in the closed position for preventing flow to the flow passage. The insert assembly or cartridge further includes a seal interposed between the two above-mentioned stem sections for isolating the first mentioned section from the flow passage. The insert assembly or cartridge also includes a deformable seal for providing static sealing engagement with the insert assembly seat, the seal adapted to be in deformed static compression against the insert assembly seat when the insert assembly is assembled with the housing.

9 Claims, 1 Drawing Sheet

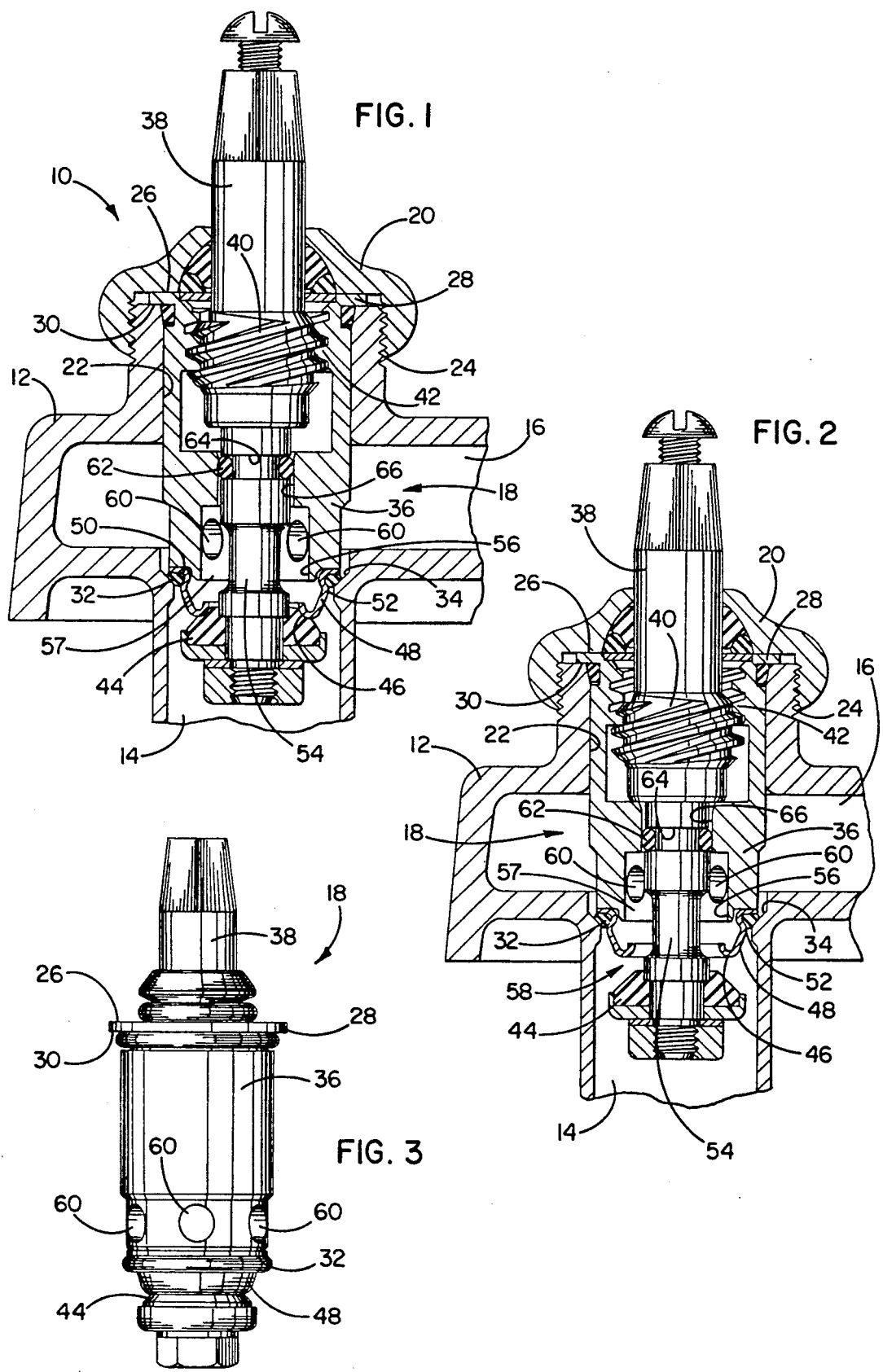

CARTRIDGE-TYPE FAUCET VALVE WITH IMPROVED SEAL

FIELD OF THE INVENTION

The present invention relates generally to valves for controlling fluid flow. More particularly, the present invention relates to cartridge-type valves for water faucets.

BACKGROUND OF THE INVENTION

Various cartridge-type faucet valves have heretofore been utilized in wash basins, sinks, bath tubs, showers, faucets and the like for controlling flow from a supply of hot and/or cold water. Such faucet valves characteristically have a valve housing or body forming a relatively permanent part of a given installation and a removable or replaceable faucet valve insert assembly, or cartridge, which is inserted into and assembled with the housing to form a complete faucet valve. A cartridge typically includes a valve seal and seat, which cooperate to provide the flow control (or the on-off action of the faucet valve) and a mechanism for controlling the faucet valve position (i.e., seal and/or seat positions) in response to an actuation of the valve, manually or otherwise. The mechanism typically includes a movable valve stem.

It has been found, however, that certain cartridge-type faucet valves have been beset with sealing problems. In particular, a problem has arisen with a seal between the valve housing and the cartridge itself. Such a seal is often needed to isolate the inlet of the valve housing, which may be under constant pressure, from the outlet, which provides the controlled flow (or no flow if the valve is closed). In prior valves, that seal has been provided by the physical abutment of a relatively incompressible (e.g. metal) portion of the cartridge with a relatively incompressible (e.g. metal) portion of the valve housing. As such, a proper seal depended upon maintaining very tight manufacturing tolerances for the mating surfaces and, more importantly, upon field installation or service personnel properly following critical torque limits when tightening the fasteners used for assembling and retaining the cartridge in the housing. This has been costly and has oftentimes resulted in an inferior seal.

A further sealing problem with prior cartridge-type faucet valves involves the seal used to prevent leakage along the valve stem. Heretofore, a retaining nut or the like has been used to hold a packing material against the stem. The packing would permit stem movement yet prevent leakage along the stem. While such an approach can reliably prevent leakage from the valve as a unit, it does nothing to prevent internal leakage from the fluid flow path within the cartridge to the mechanism of the cartridge used to control valve position. Such leakage can degrade or wash away necessary lubricant from the mechanism and can result in the accumulation of mineral deposits or corrosion within the mechanism, thereby shortening the useful life or the service interval of the valve cartridge.

SUMMARY OF THE INVENTION

Accordingly, a cartridge-type faucet valve has been provided with improved sealing for greater durability and ease of installation and maintenance.

The improved faucet valve includes a cartridge which can be installed easily with a reliable seal between the cartridge and the valve housing.

The improved faucet valve further includes an improved stem seal that effectively isolates the valve position control mechanism from the fluid flow passage.

The improved faucet valve also provides an extended useful life or service interval by reducing the degradation of or loss of lubricant from the control mechanism and by reducing the tendency for the corrosion of or the formation of mineral deposits in the control mechanism.

Further and additional advantages of the improved cartridge-type faucet valve will become apparent from the description, accompanying drawings and appended claims.

In accordance with one embodiment of the invention, an improved faucet valve is provided which includes a housing with an inlet, an outlet and an insert assembly (or cartridge) seat interposed between the inlet and outlet and for cooperating with a portion of an insert assembly or cartridge to provide a seal between the inlet and outlet. The insert assembly or cartridge includes a stationary elongated sleeve and a stem mounted within the sleeve which is longitudinally movable over a range of travel between a closed position and a fully open position. One section of the stem co-acts with the sleeve to control the longitudinal position of the stem. Another section of the stem cooperates with an internal surface portion of the sleeve to provide a longitudinally extending flow passage for communicating from the inlet to the outlet. A seal piece is mounted on the stem and is adapted for engagement with a stationary seating surface adjacent one end of the sleeve. In operation, the seal piece is engaged with the seating surface only in the closed position for preventing flow to the flow passage. The insert assembly or cartridge further includes a seal interposed between the two above-mentioned stem sections for isolating the first mentioned section from the flow passage. The insert assembly or cartridge also includes a deformable seal for providing static sealing engagement with the insert assembly seat, the seal adapted to be in deformed static compression against the insert assembly seat when the insert assembly is assembled with the housing.

BRIEF DESCRIPTION OF THE DRAWINGS

FIG. 1 is a fragmentary, vertical sectional view of one embodiment of the improved faucet valve, shown in a closed position and showing a portion of the stem in elevation.

FIG. 2 is similar to FIG. 1, but the faucet valve is shown in an open position.

FIG. 3 is an elevation view of one embodiment of the insert assembly or cartridge of the improved faucet valve.

DETAILED DESCRIPTION

Referring now to the drawings and more particularly to FIGS. 1 and 2, a preferred embodiment of the improved faucet valve 10 is shown which is suitable for use in wash basins, sinks, bath tubs, showers, faucets and the like. The faucet valve 10 includes a housing 12 with an inlet 14 and an outlet 16. Inserted into and assembled within the housing 12 is an insert assembly or cartridge 18. When assembled within the housing 12, the cartridge 18 is retained therein by means of a suitable fastener such as nut 20.

Cartridge 18, as shown in FIG. 3, is generally cylindrical in shape and fits within a generally cylindrical bore 22 formed in housing 12. Upon assembly of the cartridge 18 with the housing 12, nut 20 is threaded to the housing 12 via threads 24. The nut 20 bears against an upper surface 26 of a flange 28 of the cartridge 18. The flange 28 has a lower surface 30 which abuts a portion of the housing 12 when the cartridge 18 is assembled therewith. Cartridge 18 also includes a deformable seal 32 for providing a static sealing engagement with a cartridge seat portion 34 of housing 12. When the cartridge 18 is assembled with the housing 12, with the lower surface 30 of flange 28 in abutting relation with a portion of the housing 12, as shown in FIGS. 1 and 2, the seal 32 is deformed in static compression against the cartridge seat 34. Seal 32 may be formed of any suitable deformable sealing material such as plastic, rubber, neoprene or the like, and the shape of seal 32 may be any shape suitable to provide the deformed sealing engagement with cartridge seat 34. In the illustrated embodiment, seal 32 is a common o-ring.

Cartridge 18 includes an elongated sleeve 36 which is held stationary when the cartridge 18 is assembled with the housing 12. Mounted within the sleeve 36 is a valve stem 38 which is longitudinally movable within the sleeve 36 between a closed position and a fully open position. In the illustrated embodiment, the stem 38 is moved relative to the sleeve 36 by the interaction of a threaded section 40 of the stem 38 with a threaded section 42 of the sleeve 36 when the stem is rotated. In other words, by rotating the stem 38 within sleeve 36, the longitudinal position of stem 38 relative to sleeve 36 can be changed in a controlled manner. Threaded section 40 of stem 38 thus coacts with sleeve 36 to control the longitudinal position of stem 38 relative to sleeve 36. While in the illustrated embodiment such control is provided by coacting threaded sections, it may be provided by other mechanisms as is well known in the art.

Mounted at the lower end of stem 38, as shown in FIGS. 1 and 2, is a seal piece 44 which is adapted for engagement with a stationary seating surface 46 adjacent one end of sleeve 36. When faucet valve 10 is in the closed position as shown in FIG. 1, the seal piece 44 is engaged with seating surface 46. When faucet valve 10 is in an open position as shown in FIG. 2, the seal piece 44 is not engaged with seating surface 46. While seating surface 46 may be a portion of the sleeve 36, in the illustrated embodiment, seating surface 46 is provided by a valve seat 48 affixed to the sleeve 36. Valve seat 48 is formed by a stamping process as is well known in the art and is preferably made from corrosion-resistant metal such as stainless steel or other suitable alloys as is also well known in the art. By including seating surface 46 on a separate valve seat 48, as shown in the drawings, valve seat 48 may easily be replaced in the event that seating surface 46 becomes worn or otherwise unserviceable.

As is shown in FIGS. 1 and 2, valve seat 48 also includes a peripheral groove 50 for retaining the seal 32. Groove 50 is formed to provide support for the seal 32 when it is deformed against the cartridge seat 34. Valve seat 48 is also formed with a knee 52 disposed at a distance from the central axis of cartridge 18 which is greater than the distance of a portion of groove 50 from the central axis of cartridge 18. This configuration permits seal 32 to be installed in groove 50 prior to assembly of the cartridge 18 within the housing 12. During assembly, seal 32 is held within groove 50 by knee 52 and the elastic properties of seal 32. This simplifies the assembly process and contributes to the formation of a reliable seal.

Stem 38 includes a lower section 54 which cooperates with internal surface 56 of sleeve 36 and with valve seat 48 to provide a longitudinally extending flow passage 57 for communicating from the inlet 14 to the outlet 16. Flow passage 57 includes an annular inlet port 58, shown in FIG. 2, and outlet ports 60. Inlet port 58 is formed by stem section 54 and an internal diameter of valve seat 48. Outlet ports 60 are formed through sleeve 36.

Interposed between threaded section 40 of stem 38 and stem section 54 is a seal 62 for isolating the threaded section 40 of stem 38 from the flow passage 57. Seal 62 is retained in a peripheral groove 64 formed in stem 38 between the threaded section 40 and the lower section 54 thereof. In the illustrated embodiment, seal 62 is an o-ring, but it may be any suitable resilient sealing material such as plastic, rubber, neoprene or the like. When stem 38 is moved relative to sleeve 36, seal 62 is carried with stem 38 in groove 64 but, throughout the range of travel of stem 38, the outer diameter of seal 62 is in sliding sealing engagement with internal surface 66 of sleeve 36. Alternatively, seal 62 may be retained stationary with sleeve 36, by way of a groove in sleeve 36 or the like, with the inner diameter of seal 62 in sliding sealing engagement with stem 38 throughout its range of travel. Of course, other forms of dynamic seal between stem 38 and sleeve 36 may be used as well, as will be understood by those skilled in the art.

When faucet valve 10 is installed, inlet 14 is connected to a supply of water which may be under pressure. Outlet 16 provides a controlled flow for a sink or bathtub faucet, a showerhead, or the like. When faucet valve 10 is in the closed position as shown in FIG. 1, seal piece 44 is engaged with seating surface 46 to prevent any flow through flow passage 57. Under these circumstances, there is no flow through outlet 16 and seal 32 prevents any leakage from inlet 14 to outlet 16. When stem 38 is rotated, it is driven downward by coacting threaded sections 40 and 42. When this occurs, seal 62, which is carried in groove 64 of stem 38, maintains a sliding dynamic seal between stem 38 and surface 66 of sleeve 36. Also, as stem 38 is driven downward, seal piece 44 disengages from seating surface 46, thereby opening port 58 and permitting flow from inlet 14 through port 58, flow passage 57 and ports 60 to outlet 16. Seal 62 isolates flow passage 57 from the threaded sections 40 and 42. This minimizes any washing away or any degradation of any lubricant on the threaded sections 40 and 42. It also minimizes corrosion and the formation of mineral deposits in the area of threaded sections 40 and 42. As a result, the useful life or service interval of cartridge 18 is greatly extended.

As is apparent, the position of flange 28 is carefully adapted to provide a predetermined amount of deformation of seal 32 when the cartridge 18 is assembled within housing 12. The necessary amount of deformation of seal 32 of course depends on the nature of the seal, the material used and the pressures which will be applied thereto in service. The manner of determining the proper amount of deformation of a seal such as seal 32 is well known in the art. Flange 28 in abutment with a portion of housing 12 ensures that the proper predetermined amount of deformation of seal 32 is in fact obtained when the cartridge 18 is assembled within housing 12. Thus, as long as surface 30 of flange 28 is in abutment with housing 12, the sealing properties of seal 32 are not dependent upon the torque applied to nut 20. The torque applied to nut 20 need only be sufficient to provide a force of friction between surface 30 of flange 28 and housing 12 to prevent movement of sleeve 36 when stem 38 is rotated. Flange 28 may be formed integrally with sleeve 36 as shown in FIGS. 1 and 2, or it may be a separate piece.

The foregoing describes one embodiment of an improved cartridge-type faucet valve with improved sealing for greater durability and for ease of installation and maintenance and with a reliable seal between the insert assembly (or cartridge) and the valve housing. The various components comprising the valve may vary in size and shape, if desired, from that shown without departing from the spirit and scope of the claimed invention.

What is claimed is:

1. A faucet valve cartridge for controlling flow through a valve housing, the latter having an inlet, an outlet and a cartridge seat, the cartridge seat being interposed between the inlet and outlet and for cooperating with a portion of said cartridge to provide sealing between the inlet and outlet, said cartridge comprising a stationary elongated sleeve provided with a flow passage for communicating from the inlet to the outlet; a stem mounted within said sleeve and being longitudinally movable between a closed position and an open position, said stem having mounted thereon a seal piece adapted for engagement with a stationary seating surface adjacent a first end of said sleeve, said seal piece engaged with said seating surface only in said closed position for preventing flow to said passage; a deformable seal for providing a static sealing engagement with the cartridge seat, said seal adapted to be deformed against the cartridge seat when said cartridge is assembled with the valve housing; and a flange portion extending radially from said sleeve and having a surface adapted to be in abutting relation with a portion of the valve housing, wherein said abutment of said flange surface with said portion of the valve housing provides a predetermined amount of deformation of said seal when said cartridge is assembled with the valve housing.

2. A faucet valve cartridge for controlling flow through a valve housing, the latter having an inlet, an outlet and a cartridge seat, the cartridge seat being interposed between the inlet and outlet and for cooperating with a portion of said cartridge to provide sealing between the inlet and outlet, said cartridge comprising a stationary elongated sleeve provided with a flow passage for communicating from the inlet to the outlet; a stem mounted within said sleeve and being longitudinally movable between a closed position and an open position, said stem having mounted thereon a seal piece adapted for engagement with a stationary seating surface adjacent a first end of said sleeve, said seal piece engaged with said seating surface only in said closed position for preventing flow to said passage; a deformable seal for providing a static sealing engagement with the cartridge seat, said seal adapted to be deformed against the cartridge seat when said cartridge is assembled with the valve housing; and a flange portion extending radially from said sleeve and having a surface adapted to be in abutting relation with a portion of the valve housing, wherein said flange portion is formed integrally with said sleeve.

3. A faucet valve cartridge for controlling flow through a valve housing, the latter having an inlet, an outlet and a cartridge seat, the cartridge seat being interposed between the inlet and outlet and for cooperating with a portion of said cartridge to provide sealing between the inlet and outlet, said cartridge comprising a stationary elongated sleeve provided with a flow passage for communicating from the inlet to the outlet; a stem mounted within said sleeve and being longitudinally movable between a closed position and an open position, said stem having mounted thereon a seal piece adapted for engagement with a stationary seating surface adjacent a first end of said sleeve, said seal piece engaged with said seating surface only in said closed position for preventing flow to said passage; a deformable seal for providing a static sealing engagement with the cartridge seat, said seal adapted to be deformed against the cartridge seat when said cartridge is assembled with the valve housing; and a flange portion extending radially from said sleeve and having a surface adapted to be in abutting relation with a portion of the valve housing, wherein said abutment of said flange surface with said portion of the valve housing provides a substantial force against movement of said cartridge relative to the valve housing when said cartridge is assembled with the valve housing.

4. A faucet valve having a housing with an inlet, an outlet and an insert assembly seat, the latter being interposed between the inlet and the outlet and for cooperating with a portion of an insert assembly to provide sealing between the inlet and outlet, said insert assembly comprising a stationary elongated sleeve; a stem mounted within said sleeve and being longitudinally movable over a range of travel between a closed position and a fully open position, said stem having a first section for coacting with said sleeve to control the longitudinal position of said stem and a second section for cooperating with a first internal surface portion of said sleeve to provide a longitudinally extending flow passage for communicating from the inlet to the outlet, said stem having mounted thereon a seal piece adapted for engagement with a stationary seating surface adjacent a first end of said sleeve, said seal piece engaged with said seating surface only in said closed position for preventing flow to said passage; a first seal interposed between said first section of said stem and said second section of said stem for isolating said first section of said stem from said flow passage; a second seal for providing a sealing engagement with the insert assembly seat, said second seal in deformed static compression against the insert assembly seat; and a flange portion extending radially from said sleeve and having a surface in abutting relation with a portion of the housing, wherein said abutment of said flange surface with said portion of the valve housing provides a predetermined amount of deformation of said second seal.

5. A faucet valve having a housing with an inlet, an outlet and an insert assembly seat, the latter being interposed between the inlet and the outlet and for cooperating with a portion of an insert assembly to provide sealing between the inlet and outlet, said insert assembly comprising a stationary elongated sleeve; a stem mounted within said sleeve and being longitudinally movable over a range of travel between a closed position and a fully open position, said stem having a first section for coacting with said sleeve to control the longitudinal position of said stem and a second section for cooperating with a first internal surface portion of said sleeve to provide a longitudinally extending flow passage for communicating from the inlet to the outlet, said stem having mounted thereon a seal piece adapted for engagement with a stationary seating surface adjacent a first end of said sleeve, said seal piece engaged with said seating surface only in said closed position for preventing flow to said passage; a first second section of said stem for isolating said first section of said stem interposed between said first section of said stem and said stem from said flow passage; a second seal for providing a sealing engagement with the insert assembly seat, said second seal in deformed static compression against the insert assembly seat; and a flange portion extending radially from said sleeve and having a surface in abutting relation with a portion of the housing, wherein said flange portion is formed integrally with said sleeve.

6. A faucet valve having a housing with an inlet, an outlet and an insert assembly seat, the latter being interposed between the inlet and the outlet and for cooperating with a portion of an insert assembly to provide sealing between the inlet and outlet, said insert assembly comprising a stationary elongated sleeve; a stem mounted within said sleeve and being longitudinally movable over a range of travel between a closed position and a fully open position, said stem having a first section for coacting with said sleeve to control the longitudinal position of said stem and a second section for cooperating with a first internal surface portion of said sleeve to provide a longitudinally extending flow passage for communicating from the inlet to the outlet, said stem having mounted thereon a seal piece adapted for engagement with a stationary seating surface adjacent a first end of said sleeve, said seal piece engaged with said seating surface only in said closed position for preventing flow to said passage; a first seal interposed between said first section of said stem and said second section of said stem for isolating said first section of said stem from said flow passage; a second seal for providing a sealing engagement with the insert assembly seat, said second seal in deformed static compression against the insert assembly seat; and a flange portion extending radially from said sleeve and having a surface in abutting relation with a portion of the housing, wherein said abutment of said flange surface with said portion of the housing provides a substantial force against movement of said insert assembly relative to the housing.

7. A faucet valve cartridge for controlling flow through a valve housing, the latter having an inlet, an outlet and a cartridge seat, the cartridge seat being interposed between the inlet and outlet and for cooperating with a portion of said cartridge to provide sealing between the inlet and outlet, said cartridge comprising a stationary elongated sleeve provided with a flow passage for communicating from the inlet to the outlet; a stem mounted within said sleeve and being longitudinally movable between a closed position and an open position, said stem having mounted thereon a seal piece adapted for engagement with a stationary seating surface adjacent a first end of said sleeve, said seating surface provided by a valve seat separate from said sleeve and said seal piece engaged with said seating surface only in said closed position for preventing flow to said passage; and a deformable seal for providing a static sealing engagement with the cartridge seat, said seal retained within a peripheral groove by a radially extending knee portion disposed between said groove and said seating surface, said seal supported by said groove and adapted to be deformed against the cartridge seat when said cartridge is assembled with the valve housing.

8. A faucet valve cartridge for controlling flow through a valve housing, the latter having an inlet, an outlet and a cartridge seat, the cartridge seat being interposed between the inlet and outlet and for cooperating with a portion of said cartridge to provide sealing between the inlet and outlet, said cartridge comprising a stationary elongated sleeve provided with a flow passage for communicating from the inlet to the outlet; a stem mounted with said sleeve and being longitudinally movable between a closed position and an open position, said stem having mounted thereon a seal piece adapted for engagement with a stationary seating surface adjacent a first end of said sleeve, said seal piece engaged with said seating surface only in said closed position for preventing flow to said passage; a deformable seal for providing a static sealing engagement with the cartridge seat, said seal retained within a peripheral groove by a radially extending knee portion disposed between said groove and said seating surface, said seal supported by said groove and adapted to be deformed against the cartridge seat when said cartridge is assembled with the valve housing; and a flange portion extending radially from said sleeve and having a surface adapted to be in abutting relation with a portion of the valve housing and providing a predetermined amount of deformation of said seal when said cartridge is assembled with the valve housing, wherein said flange portion is formed integrally with said sleeve.

9. A faucet valve cartridge for controlling flow through a valve housing, the latter having an inlet, an outlet and a cartridge seat, the cartridge seat being interposed between the inlet and outlet and for cooperating with a portion of said cartridge to provide sealing between the inlet and outlet, said cartridge comprising a stationary elongated sleeve provided with a flow passage for communicating from the inlet to the outlet; a stem mounted within said sleeve and being longitudinally movable between a closed position and an open position, said stem having mounted thereon a seal piece adapted for engagement with a stationary seating surface adjacent a first end of said sleeve, said seal piece engaged with said seating surface only in said closed position for preventing flow to said passage; a deformable seal for providing a static sealing engagement with the cartridge seat, said seal retained within a peripheral groove by a radially extending knee portion disposed between said groove and said seating surface, said seal supported by said groove and adapted to be deformed against the cartridge seat when said cartridge is assembled with the valve housing; and a flange portion extending radially from said sleeve and having a surface adapted to be in abutting relation with a portion of the valve housing and providing a predetermined amount of deformation of said seal when said cartridge is assembled with the valve housing, wherein said abutment of said flange surface with said portion of the valve housing provides a substantial force against movement of said cartridge relative to the valve housing when said cartridge is assembled with the valve housing.

* * * * *

UNITED STATES PATENT AND TRADEMARK OFFICE
CERTIFICATE OF CORRECTION

PATENT NO. : 5,316,039

DATED : May 31, 1994

INVENTOR(S) : William D. Haag, et al

It is certified that error appears in the above-identified patent and that said Letters Patent is hereby corrected as shown below:

Column 7, line 7, after "first" insert --seal interposed between said first section of said stem and said--.

Column 7, lines 9-10, delete "interposed between said first section of said stem and said stem".

Column 8, line 14, delete "with" and insert therefor --within--.

Signed and Sealed this

Twenty-seventh Day of September, 1994

Attest:

BRUCE LEHMAN

Attesting Officer     Commissioner of Patents and Trademarks